US009131216B2

(12) United States Patent
Argyropoulos et al.

(10) Patent No.: US 9,131,216 B2
(45) Date of Patent: Sep. 8, 2015

(54) METHODS AND APPARATUSES FOR TEMPORAL SYNCHRONISATION BETWEEN THE VIDEO BIT STREAM AND THE OUTPUT VIDEO SEQUENCE

(75) Inventors: Savvas Argyropoulos, Berlin (DE); Bernhard Feiten, Berlin (DE); Marie-Neige Garcia, Berlin (DE); Peter List, Eppertshausen (DE); Alexander Raake, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 408 days.

(21) Appl. No.: 13/812,890

(22) PCT Filed: Jul. 26, 2011

(86) PCT No.: PCT/EP2011/062800
§ 371 (c)(1),
(2), (4) Date: Mar. 13, 2013

(87) PCT Pub. No.: WO2012/013656
PCT Pub. Date: Feb. 2, 2012

(65) Prior Publication Data
US 2013/0208814 A1 Aug. 15, 2013

(30) Foreign Application Priority Data
Jul. 30, 2010 (EP) .................... 10171454

(51) Int. Cl.
H04N 19/44 (2014.01)
H04N 17/00 (2006.01)
H04N 21/242 (2011.01)
H04N 21/43 (2011.01)
H04N 21/44 (2011.01)

(52) U.S. Cl.
CPC ....... *H04N 19/00533* (2013.01); *H04N 17/004* (2013.01); *H04N 19/44* (2014.11); *H04N 21/242* (2013.01); *H04N 21/4302* (2013.01); *H04N 21/4307* (2013.01); *H04N 21/44004* (2013.01)

(58) Field of Classification Search
None
See application file for complete search history.

(56) References Cited

U.S. PATENT DOCUMENTS 6,618,077 B1 9/2003 Baina et al.
6,751,360 B1 6/2004 Lu
(Continued)

FOREIGN PATENT DOCUMENTS

WO WO 2008034632 A1 3/2008
WO WO 2009012297 A1 1/2009

OTHER PUBLICATIONS

European Patent Office, International Search Report in International Patent Application No. PCT/EP2011/062800 (Sep. 23, 2011).

*Primary Examiner* — Dave Czekaj
*Assistant Examiner* — Nam Pham
(74) *Attorney, Agent, or Firm* — Leydig, Voit & Mayer, Ltd.

(57) ABSTRACT

A method for temporally synchronizing an input bit stream of a video decoder with a processed video sequence decoded by an external video decoder includes the steps of: capturing the input bit stream and supplying it to a bit stream analyzer; parsing and analyzing the captured input bit stream by the bit stream analyzer; decoding the input bit stream and providing reconstructed images $N_{rec}$ therefrom; storing the reconstructed images $N_{rec}$ in a buffer; and comparing a processed video sequence received from the output side of the video decoder with each of the stored reconstructed images, to find a matching frame n* from the reconstructed images in the buffer.

20 Claims, 4 Drawing Sheets

(56) References Cited

U.S. PATENT DOCUMENTS

| | | |
|---|---|---|
| 8,228,385 B2 | 7/2012 | Keyhl et al. |
| 2003/0179740 A1 | 9/2003 | Baina et al. |
| 2004/0184530 A1 | 9/2004 | Cheng |
| 2007/0097266 A1 | 5/2007 | Souchard |
| 2008/0253689 A1* | 10/2008 | Ferguson ..................... 382/294 |
| 2009/0262198 A1 | 10/2009 | Yamagishi et al. |
| 2009/0279777 A1* | 11/2009 | Malfait et al. ................ 382/168 |
| 2011/0169963 A1* | 7/2011 | Winkler ....................... 348/180 |

* cited by examiner

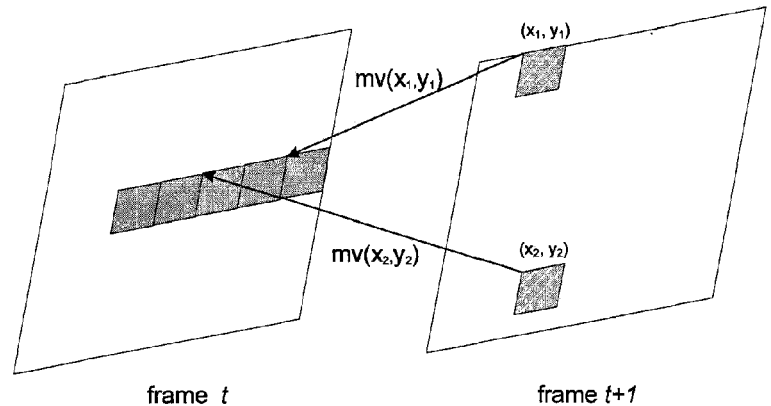

frame t    frame t+1

▨ macroblock that was not correctly received and is concealed by the decoder

▨ macroblock which references an erroneous macroblock in the previously decoded frame. The error propagates to this macroblock

Fig. 6

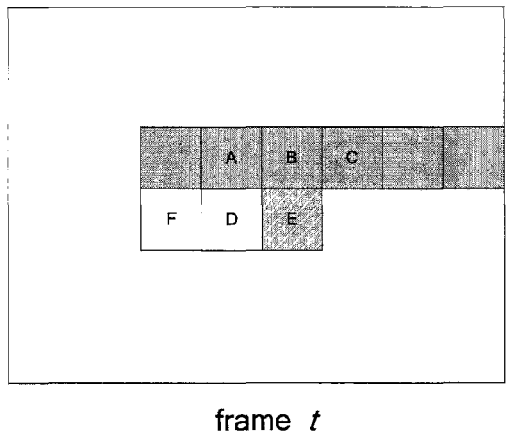

frame t

▨ macroblock that was not correctly received and is concealed by the decoder or which is erroneous due to temporal propagation ☐ macroblock that was correctly received and decoded by the decoder ▨ macroblock which references an erroneous macroblock in the same frame. The error propagates to this macroblock

Fig. 7

METHODS AND APPARATUSES FOR TEMPORAL SYNCHRONISATION BETWEEN THE VIDEO BIT STREAM AND THE OUTPUT VIDEO SEQUENCE

CROSS-REFERENCE TO RELATED APPLICATIONS

This application is a U.S. National Phase application under 35 U.S.C. §371 of International Application No. PCT/EP2011/062800, filed on Jul. 26, 2011, and claims benefit to European Patent Application No. EP 10171454.1, filed on Jul. 30, 2010. The International Application was published in English on Feb. 2, 2012 as WO 2012/013656 A1 under PCT Article 21(2).

FIELD

The invention relates to methods and apparatuses for temporally synchronising the input video bit stream of a video decoder with the processed video sequence decoded by the video decoder.

BACKGROUND

The proliferation of video communication applications over the last years has necessitated the development of robust video quality measures to assess the Quality of Experience (QoE), defined as the service quality perceived by the user. The assessment of video quality is a critical aspect for the efficient designing, planning, and monitoring of services by the content providers.

Nowadays, hybrid video quality assessment models/systems use a combination of packet information, bit stream information and the decoded reconstructed image. In general, in a hybrid video quality assessment algorithm the features extracted or calculated from the bit stream (e.g., motion vectors, macroblock types, transform coefficients, quantization parameters, etc.), and the information extracted by packet headers (e.g., bit rate, packet loss, delay, etc.) are combined with the features extracted from the output reconstructed images in the pixel domain. However, if the former features do not temporally correspond to the latter due to loss of temporal synchronisation, then the evaluation of quality would not be accurate. Thus, the first step in every hybrid video quality assessment algorithm is the synchronisation of the video bit stream with the decoded reconstructed images.

A block diagram of a hybrid video quality assessment system is depicted in FIG. 1. At the end-user side, a probe device captures the incoming bit stream, and then parses and analyses it in order to extract and compute some features. These features are input to the module which is responsible for the temporal synchronisation of the video bit stream with the output video sequence.

Moreover, the decoding device, e.g., the set-top-box (STB), decodes the received bit stream and generates the processed video sequence (PVS) which is displayed by the output device. The PVS is also input to the module which is responsible for the temporal synchronisation so that it can be temporally synchronised with the video bit stream.

In general, the main reason for the loss of temporal synchronisation between the bit stream and the PVS is the delay. When the video stream is transmitted over a best-effort network, such as the Internet, the arrival time of each packet is not constant and may vary significantly. The variability over time of the packet latency across a network is called jitter. To ensure a smooth playback of the sequence without jerkiness, most video systems employ a de-jitter buffer. The received bit stream is written to the input buffer based on the arrival time of each packet, and the picture data corresponding to a frame are read out of it into the decoder at predetermined time intervals corresponding to the frame period. The display timing of each picture is determined by the timestamp field recorded in the packet header. That is, the timestamp value corresponds to the delay time period which elapses from the detection of picture start code until the picture display timing.

In the above described video decoding system, the display timing of each video frame is determined according to the data which is included in the video bit stream for determination of the display timing. Since the time for the display of a frame is not fixed, the PVS can not always be matched exactly to the original bit stream.

In the literature, the problem of temporal synchronisation between a source and a distorted video sequence has been previously studied and is also referred to as video registration. In M. Barkowsky, R. Bitto, J. Bialkowski, and A. Kaup, "Comparison of matching strategies for temporal frame registration in the perceptual evaluation of video quality, *Proc. of the Second International Workshop on Video Processing and Quality Metrics for Consumer Electronics*, January 2006, a comparison between block matching and phase correlation for video registration is presented and examined in terms of performance and complexity. Also, a frame-matching algorithm to account for frame removal, insertion, shuffling, and data compression was presented in Y. Y. Lee, C. S. Kim, and S. U. Lee, "Video frame-matching algorithm using dynamic programming," Journal of Electronic Imaging, SPIE, 2009, based on the minimization of a matching cost function using dynamic programming. In J. Lu, "Fast video temporal alignment estimation," (U.S. Pat. No. 6,751,360 B1), a fast temporal alignment estimation method for temporally aligning a distorted video with a corresponding source video for video quality measurements was presented. Each video sequence is transformed into a signature curve by calculating a data-point for each frame as a cross-correlation between two subsequent frames. The temporal misalignment of the distorted video is then determined by finding the maximum value of the normalized cross-correlation between the signature curves of the examined video sequences. Another method for identifying the spatial, temporal, and histogram correspondence between two video sequences is described in H. Cheng, "Video registration based on local prediction errors," (U.S. Pat. No. 7,366, 361 B2). The PVS is aligned to the reference video sequence by generating a mapping from a selected set of one or more original frames to the processed set so that each mapping minimizes a local prediction error. In K. Ferguson, "Systems and methods for robust video temporal registration," (US-A-2008/0253689), frame and sub-image distillation measurements are produced from the reference and test video sequences. Then, they are linearly aligned using local Pearson's cross-correlation coefficient between frames. Additionally, in C. Souchard, "Spatial and temporal alignment of video sequences," (US-A-2007/0097266), a motion function is defined to describe the motion of a set of pixels between the frames of the test and the reference video sequence and a transform is used to align the two images.

In J. Baina et al, "Method for controlling digital television metrology equipment, U.S. Pat. No. 6,618,077 B1, 2003", a method for the extraction of parameters from an MPEG-2 Transport Stream is proposed to generate synchronisation signals. However, this method is only applicable when the video elementary stream is packetized in a MPEG-2 Transport Stream and cannot be applied to any transportation protocol. Contrary to that, the proposed method can be applied to any video bitstream without the need for a specific transportation or application protocol. Moreover, the above method provides synchronisation signals to a video quality monitoring algorithm to indicate which pictures (video frames) of the video signal should be used for the quality prediction. In contrast to that, the proposed method identifies the part of the bitstream that corresponds to each picture under consideration from an external decoder. Finally, this method does not exploit the bitstream information to synchronise the video bitstream with the picture from the external video decoder whereas the proposed invention exploits the bitstream to perform the synchronisation. The exploitation of the video bitstream enables the consideration of the effects from packet losses and can be applied in case of transmission errors.

Another method for the alignment of two data signals was presented in "M. Keyhl, C. Schmidmer, and R. Bitto, Apparatus for determining data in order to temporally align two data signals, WO 2008/034632 A1, 2008". In contrast to that, the proposed invention provides synchronisation between the picture from an external video decoder and the input video bitstream. Moreover, the above method performs the synchronisation in the pixel domain, thus it requires a full decoding of the input video bitstream. In contrast, the proposed method provides two embodiments (second and third embodiment) in which the synchronisation is performed without full decoding and from the packet headers.

Yet another method for synchronising digital signals was presented in "J. Baina et. al, "Method for synchronising digital signals", US 2003/0179740 A1, 2003. It is a full-reference method, i.e. the reference signal is required to perform the synchronisation. Contrary to that, the present invention proposes a no-reference method for the synchronisation between a video bitstream and the decoded pictures from an external video decoder, thus, the reference signal (video sequence) is not necessary. Moreover, the above method requires the extraction of a parameter from the bitstreams for the synchronisation and, therefore, cannot be applied in case of encrypted bitstreams. In contrast, the method in the proposed invention describes an embodiment for the synchronisation of an encrypted bitstream with the PVS.

SUMMARY

In an embodiment, the present invention provides a method for temporally synchronising an input bit stream of a video decoder with a processed video sequence decoded by an external video decoder. The method includes the steps of: capturing the input bit stream and supplying it to a bit stream analyzer; parsing and analyzing the captured input bit stream by the bit stream analyzer; decoding the input bit stream and providing reconstructed images $N_{rec}$ therefrom; storing the reconstructed images $N_{rec}$ in a buffer; and comparing a processed video sequence received from the output side of the video decoder with each of the stored reconstructed images, to find a matching frame n* from the reconstructed images in the buffer.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 shows generation of error propagation maps in the internal decoder due to temporal (inter) prediction; and FIG. 7 shows generation of error propagation maps in the internal decoder due to intra prediction.

DETAILED DESCRIPTION

Figure 1:
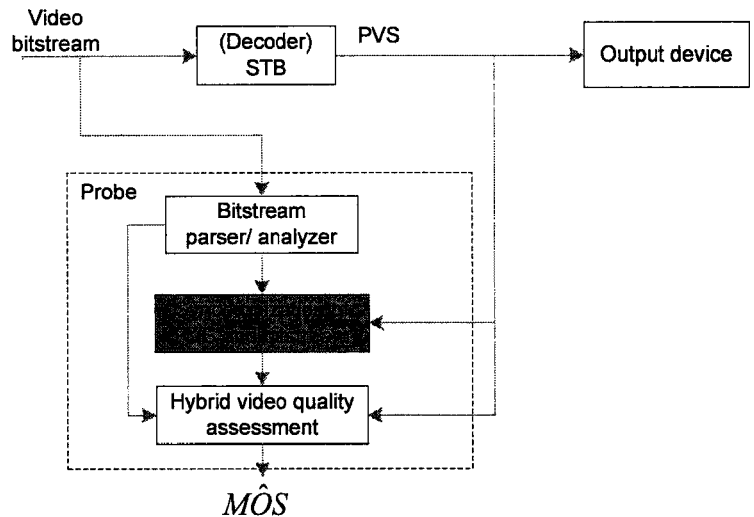
FIG. 1 shows a conventional probe device for temporal synchronisation of the processed video sequence with the bit stream and the decoded image data.

Embodiments of the present invention provide a method and apparatus to temporally synchronise the input video bit stream of a video decoder, e.g. a set-top-box (STB), with the processed video sequence (PVS) and enable their synchronisation.

According to a first aspect, the invention provides a method for temporally synchronising the input bit stream of a video decoder with the processed video sequence decoded by an external video decoder, the method comprising the steps of:
a) capturing the input bit stream and supplying it to a bit stream analyzer;
b) parsing and analyzing the captured input bit stream by the bit stream analyzer;
c) decoding the input bit stream and providing reconstructed images $N_{rec}$ therefrom;
d) storing the reconstructed images $N_{rec}$ in a buffer; and
e) comparing a processed video sequence received from the output side of the video decoder with each of the stored reconstructed images, to find a matching frame n* from the set of reconstructed images in the buffer.

The method may further comprises the step f) of supplying the matching frame n* and its corresponding part of the bit steam to a video quality assessment unit. The video quality assessment unit may estimate a subjective quality score based on the obtained information from the bit stream and the processed video sequence.

Step b) of the method may further comprise extracting, from the bit stream, for each image the packets that have been lost due to transmission errors and the corresponding areas within each frame that have been affected by the packet loss; and an error propagation map based on the motion vectors and macro block types, which denotes which pixels of each frame reference an erroneous region for their prediction and are thus prone to have been impacted by the packet loss.

Furthermore, step e) may comprise computing a distance metric between the processed video sequence and the reconstructed image in the buffer by exploiting information extracted from the bit stream and the PVS. The information extracted from the bit stream may comprise spatial and temporal location of impairments due to packet loss.

According to a second aspect, the invention provides a method for temporally synchronising the input bit stream of a video decoder with the processed video sequence decoded by the video decoder without fully decoding the video bitstream to the pixel domain, the method comprising the steps of:

a) capturing the input bit stream and supplying it to a bit stream analyzer;
b) analyzing the captured bit stream by the bit stream analyzer to generate error maps I(x,y,t) and a set A of pixels that have been impacted by packet loss, wherein I(x,y,t) denote the error map value at location (x,y) of the t-th frame, x=0, 1, ..., M, and y=0, 1, ..., N, where M, N are the horizontal and vertical dimensions of each frame of the video sequence, respectively;
c) storing, in a buffer, the error maps of $N_{rec}$ frames, generated by the bit stream analyzer in step (b); and
d) comparing the stored error maps of the generated $N_{rec}$ frames with the corresponding error map of the current processed video sequence, to find a matching frame n* from the set of reconstructed frames in the buffer that matches the current image of the processed video sequence.

The method may comprise step e) of supplying the matching frame n* and its corresponding part of the bit steam to a video quality assessment unit.

It is furthermore preferred that between steps c) and d) the following steps are performed:
extracting the edges of current image of the processed video sequence;
computing the contour of the edges that are likely to belong to an area affected by the packet loss;
comparing the edge contour of the processed video sequence with the edge contour of the error maps stored in the buffer.

According to a third aspect, the invention provides a method for temporally synchronising the encrypted input bit stream of a video decoder with the processed video sequence decoded by the video decoder, the method comprising the steps of:

a) supplying the encrypted input bit stream to an analysis module;
b) analysing, in the analysis module, the packet header information of the encrypted input bit stream, and calculating the size and the type of the pictures contained in the bit stream;
c) extracting, on the basis on the calculated picture sizes and types, features that are representative of the content depicted in the video pictures;
d) extracting the type of content and respective features representative of the content from the pictures of the processed video sequence;
e) comparing the features extracted in step d) from the current picture of the processed video sequence with the features extracted in step c) from the analysed pictures to compute the part of the bitstream that corresponds to the current processed video sequence.

The features extracted in steps c) and d) are preferably time-varying features, and these steps may be performed in the pixel domain.

According to a preferred embodiment, the feature and the part of the bitstream which corresponds to the processed video sequence under examination is further input to a video quality assessment module.

Step b) may further detect frames that have been affected by the packet loss, and may further comprise the steps of:
f) examining the current picture of the processed video sequence for artifacts generated due to packet losses; and
g) matching of the processed video sequence with the corresponding frame of the bit stream, wherein, if the current picture of the processed video sequence was detected in step f) to contain artefacts that were inserted as a result of a packet loss, then that picture is matched with the part of the bit stream corresponding to the frame which was found in step b) to contain the packet loss.

A further aspect of the invention relates to an apparatus for temporally synchronising the input bit stream of a video decoder with the processed video sequence decoded by an external video decoder, the apparatus comprising:
a bit stream analyzer receiving the input bit stream, the bit stream analyzer being configured for parsing and analyzing the input bit stream, and
a synchronisation module being configured for synchronising the analyzed bit stream with the processed video sequence,
the synchronisation module comprising:
a decoder receiving from the bit stream analyzer the analyzed bit stream, and configured to provide therefrom reconstructed images $N_{rec}$,
a buffer being configured to store said reconstructed images $N_{rec}$ from said decoder so that the output image represented by the processed video sequence can be compared to this specific number of previously reconstructed images, and
a pixel-domain comparison unit receiving the analyzed bit stream from the bit stream analyzer, the reconstructed images from the buffer, and the processed video sequence, the comparison unit being configured to
compare the processed video sequence with each one of the reconstructed images in the buffer, and
determine the best matching image in the video buffer.

The apparatus preferably comprises a video quality assessment module which combines information from the bit stream and the processed video sequence to evaluate the quality of the video sequence. The comparison unit may further be configured to compute a distance metric between the processed video sequence and the examined reconstructed image in the buffer by exploiting information extracted from the bit stream. Furthermore, the comparison unit is configured to output the best matching image to the video quality assessment module for estimating a subjective quality score based on information from the bit stream and the processed video sequence.

It is furthermore preferred that the bit stream analyzer is configured to extract, from the bit stream, for each picture the packets that have been lost due to transmission errors and the corresponding areas within each frame that have been affected by the packet loss; and an error map based on the motion vectors and macro block types, which denotes which pixels of each frame reference an erroneous region for their prediction and are thus prone to have been impacted by the packet loss.

According to a further aspect, the invention provides an apparatus for temporally synchronising the input bit stream of a video decoder with the processed video sequence decoded by the video decoder, the apparatus comprising:
a bit stream analyzer receiving the input bit stream, the bit stream analyzer being configured for analyzing the input bit stream for packet header information of the encrypted input bit stream, and calculating the size and the type of the frames contained in the bit stream, and
a synchronisation module being configured for synchronising the analyzed bit stream with the processed video sequence,
the synchronisation module comprising:
an extraction module receiving from the bit stream analyzer the analyzed bit stream, and configured to generate error maps I(x,y,t) and a set A of pixels that have been impacted by packet loss, wherein I(x,y,t) denote the error map value at location (x,y) of the t-th frame, x=0, 1, ..., M, and y=0, 1, ..., N, where M, N are the horizontal and vertical dimensions of each frame of the video sequence, respectively, a buffer being configured to store the error maps of $N_{rec}$ frames, internally generated by the bit stream analyzer within the probe, and an error pattern search module receiving the error maps of the reconstructed frames $N_{rec}$, from the buffer, and the corresponding error map of the processed video sequence, the error pattern search module being configured to compare the stored error maps of the $N_{rec}$ reconstructed frames with the corresponding error map of the current processed video sequence, and to determine a matching frame n* from the set of reconstructed frames in the buffer that matches the current image of the processed video sequence.

According to a further aspect, the invention provides an apparatus for temporally synchronising the encrypted input bit stream of a video decoder with the processed video sequence decoded by the video decoder, the apparatus comprising:

a bit stream analyzer receiving the encrypted input bit stream, the bit stream analyzer being configured for parsing and analyzing the input bit stream, and a synchronisation module being configured for synchronising the analyzed bit stream with the processed video sequence, characterized in that the synchronisation module comprises an first extraction module being configured for extracting, on the basis on the calculated picture sizes and types, features that are representative of the content depicted in the video pictures, a second extraction module being configured for extracting the type of content and respective features representative of the content from the pictures of the processed video sequence, and a comparison unit connected to the first extraction unit and the second extraction unit, the comparison unit being configured to compare the features extracted from the current picture of the processed video sequence with the features extracted from the analysed pictures, and to compute the part of the bitstream that corresponds to the current processed video sequence.

It can be achieved in general terms by the provision of a device (probe) which, according to the present invention, includes a bit stream analyzer for parsing and decoding the input bit stream, a synchronisation module which is responsible for temporally synchronising the bit stream with the PVS.

The device which is responsible for the temporal synchronisation of the video bit stream and the PVS comprises of a buffer which stores the reconstructed images which are output from the decoder. This buffer should be able to store a specific number of reconstructed images $N_{rec}$ from the decoding device within the probe so that the output image can be compared to this specific number of previously reconstructed images.

The module which is responsible for the synchronisation of the PVS and the video bit stream performs the following operations:

a) compares the PVS with each one of the reconstructed images in the buffer b) computes a distance metric between the PVS and the examined reconstructed image in the buffer by exploiting information extracted from the bit stream (e.g., spatial and temporal location of impairments due to packet loss)

c) determines the best matching image in the video buffer and outputs it to the video quality assessment module which is responsible for estimating the subjective score MOS based on information from the bit stream and the PVS.

In the following, the invention will be described in more detail.

Figure 2:
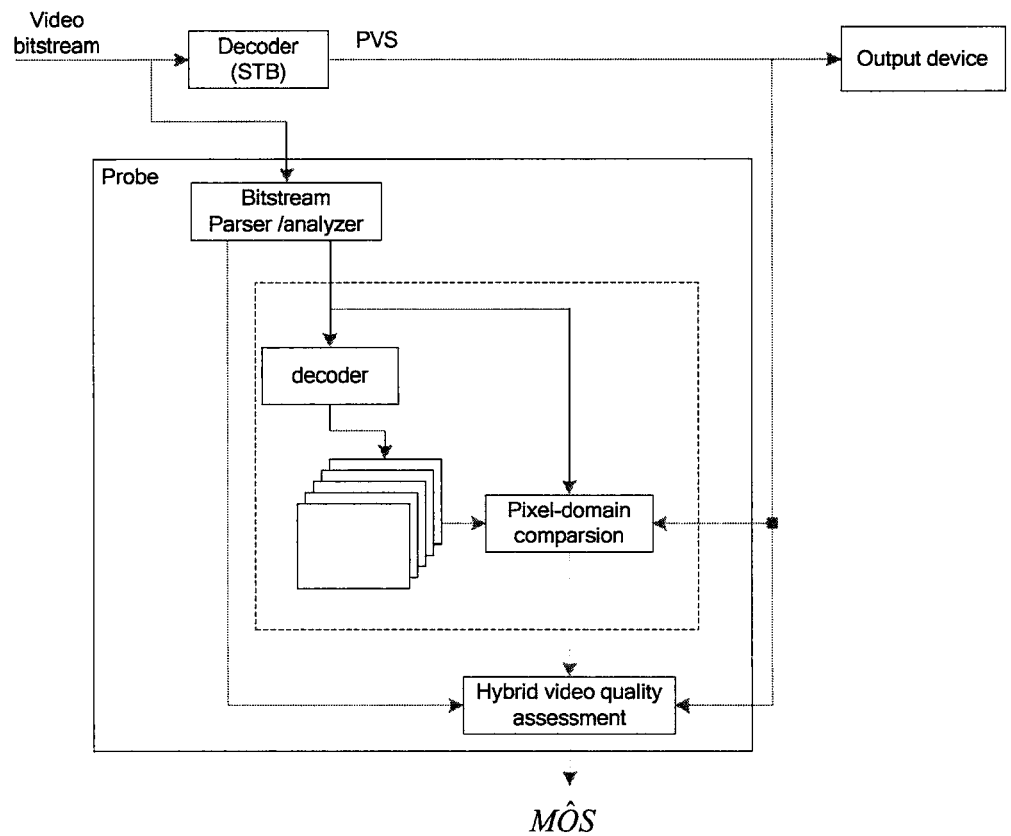
FIG. 2 shows a block diagram for the synchronisation of the bit stream with the output image according to a first preferred embodiment of the invention.

First, a first embodiment of temporal synchronisation between the bit stream and the PVS will be described with reference to FIG. 2.

The temporal synchronisation between the bit stream and the decoded/processed video sequence consists of two steps. Initially, in the first step, the apparatus according to the invention, i.e. a probe device, captures the bit stream and feeds it to the bit stream analyzer which extracts the following information for each picture:

a. the packets that have been lost due to transmission errors and the corresponding areas within each frame that have been affected by the packet loss; and b. an error propagation map based on the motion vectors and macroblock types, which denotes which pixels of each frame reference (for prediction) an erroneous region for their prediction and are thus prone to have been impacted by the packet loss.

Let A denote the set of pixels that have been affected by the packet loss and the pixels that reference lost pixels for their prediction. Also, let I(x,y,t) denote the error propagation map value at location (x,y) of the t-th frame, x=1, 2, ..., M, and y=1, 2, ..., N, where M, N are the horizontal and vertical dimensions of each frame of the video sequence, respectively. The value for those pixels that belong to the set A is one, otherwise their value is zero. Thus:

$$I(x, y, t) = \begin{cases} 1, & (x, y) \notin A \\ 0, & (x, y) \in A \end{cases} \quad \text{Eq. (1)}$$

Figure 5:
FIG. 5 shows an example of error propagation maps for subsequent frames.
Figure 5:
Figure 5:
Figure 5:
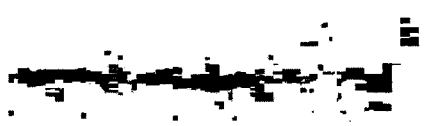
Figure 5:
Figure 5:
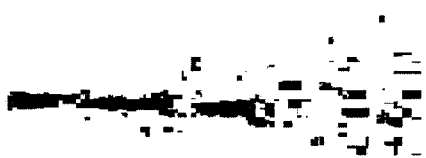
Figure 5:
Figure 5:

In other words, the set A contains all pixels that will not be identical between the processed video sequence and the reconstructed image of the decoder within the probe due to the different error concealment techniques. For this reason, all pixels belonging to set A are denoted as unavailable for the temporal synchronisation in the following stage. An example of the derivation of the error propagation maps is depicted in FIG. 5. The packet loss occurs in the first frame (in FIG. 5 the dark area in the picture on the right denotes the macroblocks that have been impaired due to the packet loss) and the pixels of the subsequent frames that reference the affected area of the first frame for the prediction process are computed and marked as unavailable for the synchronisation process. This will assist in eliminating those pixels that may be different between the reconstructed images and the processed video sequence due to the application of different error concealment techniques between the internal video decoder of the probe and the decoder of the decoding device, e.g., the STB.

In the following, more information for the generation of the error propagation maps within the internal decoder is provided. For each picture, the probe analyzer detects the number and position of the macroblocks that were not received correctly (e.g., due to network impairments and/or packet losses) in the bitstream. The detection is based on the parsing of the slice headers which denote the beginning of a new slice. Note that, in modern encoding schemes, a slice is defined as the encoding unit that can be independently encoded without referencing other information from the same picture. Thus, all macroblocks between the place where the loss occurs and the end of the slice are marked as undecodable. As an example, in FIG. 6, it is assumed that the error occurs in frame t and the affected macroblocks are denoted with gray. The value of the error propagation map for all the coordinates belonging to that macroblocks are set to 1 and to 0 for all the other (correctly received and decoded) frames.

Additionally, due to the predictive nature of the encoder, the macroblocks in the subsequent frames may reference the previous frames in order to be decoded. For inter predicted pictures (P and B pictures), the information for the referenced location in the previous frames is contained in the bitstream in the following syntax elements for each macroblock: (a) the reference index, which denotes the reference frame to be used (b) the motion vector which denotes the (horizontal and vertical) displacement from the original location of the macroblock. Note that in modern encoders, e.g. H.264/AVC, the reference index and the motion vector may be different for the sub-partitions of the macroblock. Therefore, the error propagation map for all the coordinates of the macroblocks that reference an erroneous area in the reference frames is set to 1, otherwise to 0.

An example of this procedure is depicted in FIG. 6. FIG. 6 shows the generation of error propagation maps in the internal decoder due to temporal (inter) prediction. The error originally occurs in frame t (gray macroblocks) and propagates to the subsequent frame t+1 in the macroblocks at positions ($x_1$, $y_1$) and ($x_2$, $y_2$) which reference the erroneous macroblocks in frame t. Note that no innovation error occurs in frame t+1 but the macroblocks are erroneous due to reference of erroneous information in the reference frame. That is, the macroblocks in frame t+1, macroblocks at positions ($x_1$, $y_1$) and ($x_2$, $y_2$) reference the erroneous macroblocks at frame t and are therefore denoted as erroneous (i.e., the error propagation map for these frame is set to 1).

Therefore, for temporally predicted macroblocks:

$$I(x,y,t)=I(x+mv_x, y+mv_y, t+r) \qquad \text{Eq. (2)}$$

where x, y denote the row and column of the macroblock under consideration, t denotes the frame number, $mv_x$ and $mv_y$ denote the horizontal and vertical motion vectors of that macroblock, and t+r denotes the reference index for the frame to be used as reference.

Furthermore, errors may propagate due to intra prediction, that is due to prediction of a macroblock from neighbouring macroblocks in the same frame. Note that in modern encoding schemes, a macroblock may be encoded in intra mode, even if it belongs to an inter-predicted picture. This is illustrated in FIG. 7, where the macroblocks A, B, and C, are erroneous (either because a packet loss has occurred at that position or because they are temporally predicted and reference an erroneous area in previously decoded pictures), and are thus concealed by the decoder. However, if macroblock, say D, is intra encoded and uses macroblocks A, B, and C, as reference, then the error propagates to that macroblock and the error propagation map is set to 1. Otherwise, if the macroblock does not use the erroneous macroblocks as reference, the error propagation map for the coordinates of that macroblocks is set to 0. Macroblocks F, D, E are received correctly. However, macroblock E references macroblocks D, B, and C and therefore the error propagates to it.

It must be noted that the generation of the error propagation map does not require the full decoding of the bitstream at the pixel level. Indeed, it can be generated by using the following information which is extracted from the bitstream by the bitstream analyzer: (a) the slice headers, (b) the picture types, (c) the macroblock types, (d) the reference index of the temporally predicted macroblocks.

Furthermore, the separate decoder within the probe device decodes the received bit stream, and the reconstructed pictures are stored in a buffer. The size of the buffer should be large enough to account for the delay that may be incurred by the STB. Let the maximum expected delay be d (in seconds), and let f be the frame rate of the video sequence. Then, the buffer should be able to store $N_{rec}=d·f$ frames in total.

In the second step, the processed video sequence is compared with each one of the reconstructed pictures in the buffer. The purpose of this comparison is to find a matching frame n* from the set of reconstructed pictures in the buffer, based on the following equation:

$$n^* = \arg\min_n \sum_{i=0}^{M-1} \sum_{j=0}^{N-1} |F'(x, y, t) \cdot I(x, y, n) - F(x, y, n) \cdot I(x, y, n)| \qquad \text{Eq. (3)}$$

where F'(x,y,t) is the pixel value in position (x,y) of the t-frame of the processed video picture under examination, and F(x,y,n) is the pixel in the same position of the n-th frame in the buffer of reconstructed pictures, n=0, 1, ..., $N_{rec}$. The multiplication of the pixel values of each picture with the error propagation map is applied in order to exclude those pixels that have been affected by the packet loss (either directly or due to error propagation) and ensure that the matching process is restricted to those pixels that are likely to be more similar between the two pictures. It must be also noted, that instead of the specific function used here (which is called sum of absolute differences, SAD) for the minimization, any similar function could be used, for example the mean-squared error.

After the matching process is finished, the matched frame n* is removed from the buffer of the reconstructed pictures and the matched frame, along with its corresponding part of the bit stream can be further employed, e.g., to be used as input to the module which is responsible for hybrid video quality assessment.

In the following, a second embodiment of the synchronisation between the video bit stream and the decoded video sequence will be described.

Figure 3:
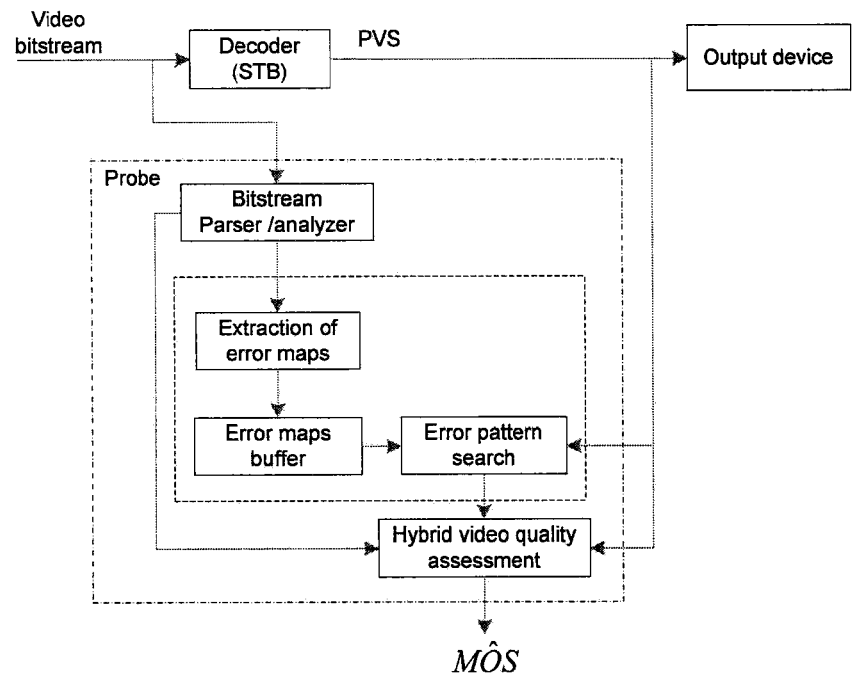
FIG. 3 shows a block diagram of a second preferred embodiment of the present invention for the synchronisation between the video bit stream and the processed video sequence.

In the second embodiment of the present invention, the synchronisation between the bit stream and the processed video sequence is performed by analyzing the bit stream, extracting information for the area of each frame that is affected from the packet loss, and then examining if the same pattern of errors appears in the processed video sequence. The block diagram of the overall procedure is depicted in FIG. 3.

In the first step, the bit stream analyzer within the probe device processes and analyzes the bit stream to generate (for each frame) the error map I( ... ) and, thus, the set A of pixels that have been impacted by the packet loss, as defined above in the context of the first embodiment. The error maps of $N_{rec}$ frames are stored in a buffer so that they can later be matched with the corresponding error maps of the processed video sequence, as explained below.

In the following step, the macroblocks of current picture of the processed video sequence that have been impaired due to a packet loss are estimated and the error map $I_{PVS}(\ldots)$ and the set $A_{PVS}$ are generated, as defined above in the context of the first embodiment. Next, the contour of the pixels of the error map $I_{PVS}(\ldots)$ is estimated. The method for estimating the impaired macroblocks of the current picture and the contour of the pixels belonging to these macroblocks is out of scope of this invention, thus any method known to the skilled person could be used, for example the method proposed in G. Valenzise et. al., "Estimating channel-induced distortion in H.264/AVC video without bitstream information," QoMEX, 2010.

The edge of the contour of the processed video sequence is to be compared with the edge of the contour of the error maps that have been previously stored in the buffer. If the matching of the contours is constrained in the area defined by the error map, which is the pixels belonging to the set A, then the edges of the contour detected from the processed video sequence are not taken into consideration. Also, since there are typically slight misinterpretations of the area detected as erroneous and the corresponding area that is detected as erroneous from the processed video sequence, the area of search is increased by k pixels to ensure that the edges of the contour detected by the decoder are not smaller than those detected in the processed video sequence. In this embodiment, k is selected to be equal to 5. However, any other value could be selected.

Thus, the set $A_{PVS}$ of pixels that belong to the area where the edges of the contour due to the packet loss are detected (increased as noted above) is produced, and the error map $I_{PVS}$ is generated. Let $I_{PVS}(x,y,t)$ denote the error map value of the t-th processed video sequence picture at location $(x,y)$, $x=1, 2, \ldots, M$, and $y=1, 2, \ldots, N$, where M, N are the horizontal and vertical dimensions of each frame of the video sequence, respectively. Then:

$$I_{PVS}(x, y, t) = \begin{cases} 1, & (x, y) \notin A_{PVS} \\ 0, & (x, y) \in A_{PVS} \end{cases} \quad \text{Eq. (4)}$$

In the third step, the error map of the current picture of the processed video sequence is compared with each one of the error maps (that were generated by analyzing the bit stream in the first step) which are stored in the buffer. The purpose of this comparison is to find a matching frame n* from the set of reconstructed pictures in the buffer, that matches the current picture of the processed video sequence based on the following equation:

$$n^* = \arg\min_n f(I(x, y, n), I_{PVS}(x, y, t)) \quad \text{Eq. (5)}$$

where $I_{PVS}(x,y,t)$ is the value in position $(x,y)$ of the t-frame of the error map of the PVS under examination, and $I(x,y,n)$ is the pixel in the same position of the error map corresponding to the n-th frame, $n=1, 2, \ldots, N_{rec}$.

Finally, a hybrid video quality assessment module which combines information from the bit stream and the processed video sequence to evaluate the quality of the video sequence may be present as shown in FIG. 3.

The function $f(\ldots)$ is a function that can be used to determine the similarity between the two error maps based on contour pattern matching. The contour-based pattern matching algorithm is out of scope of the present invention and any relevant method could be used, e.g., the method in T. Adamek, and N. O'Connor, "Efficient contour-based shape representation and matching," in Multimedia Information Retrieval, 2003, could be used for this purpose.

In the following, temporal synchronisation between the bit stream and the decoded image of an encrypted video sequence according to a further embodiment of the invention will be described.

The problem of frame synchronisation becomes more evident when the video sequence is encrypted and the only available information for the bit stream can be extracted from the packet headers. The parameters that can be extracted from the bit stream based only on the inspection of the packet headers are the size and the type of each frame.

Figure 4:
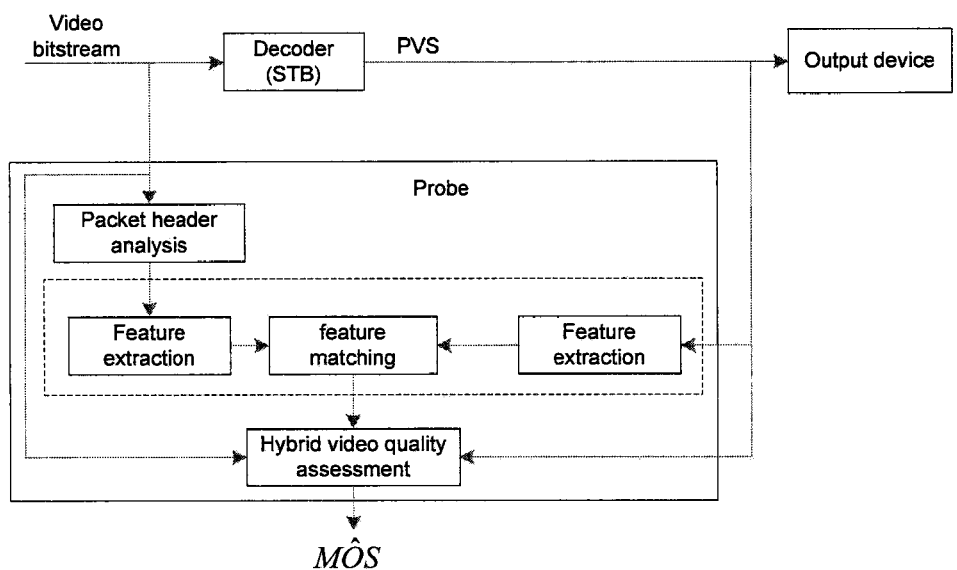
FIG. 4 shows synchronisation between the bit stream and the decoded image of an encrypted video sequence, in accordance with a further preferred embodiment of the invention.

Synchronisation Based on Frame-Based Feature Matching:

The first embodiment of the method for synchronisation between the video bit stream and the decoded image of an encrypted video sequence addresses the case where there are no packet losses in the bit stream and is shown in FIG. 4.

In the first step, the video bit stream is fed to a module which is responsible for the analysis of the packet header information, and the calculation of the size and the type of the frames (intra, predictive, or bi-predictive). The method for the extraction of the type of frames of encrypted video based on their size is out of scope of this patent. For example, the method described at the end of this description could be used.

In the second step, the information about the frame sizes and types is used in order to extract (for example time-varying) features that are representative of the content depicted in the video frames. Since the payload information is not available due to encryption, only an approximation of the content class can be estimated. The method for content class estimation based on frame sizes and frame types is out of scope of the present invention. Any available method for this purpose could be used, e.g., A. Clark, "Method and system for content estimation of packet video streams," WO 2009/012297 A1.

Similarly, the type of content and respective (e.g. time-varying) features representative of the content are extracted from the pictures of the processed video sequence. Since the present invention focuses only on the synchronisation aspects between the bit stream and the processed video sequence, the method for the extraction of features from the picture (in the pixel domain) and the detection of content type is not within its scope.

In the third step, the features extracted from the current picture of the processed video sequence are matched with the features extracted from the frames which were analyzed by the packet header analysis module. Note that the corresponding feature and synchronisation information about the part of the bitstream which corresponds to the current PVS under examination can be used as input to the module which is responsible for the assessment of video quality. As shown in FIG. 4, a hybrid video quality assessment module may be present which combines information from the bit stream and the processed video sequence to evaluate the quality of the video sequence.

Temporal Synchronisation Based on Packet Loss Event Triggering:

In this embodiment of the present invention, it is assumed that the bit stream and the processed video sequence are synchronised when no errors (e.g., due to packet losses) occur, based on the method described in the previous subsection and it considers the case when synchronisation is required when a packet loss is detected.

In the first step, the video bit stream is fed to the module which is responsible for the analysis of the packet header information, the calculation of the frame types, and the detection of the frames that have been affected by the packet loss.

The type of all the frames is detected and thus it is determined whether a packet loss propagates to its subsequent frames or not due the prediction process.

In the following step, the current picture of the processed video sequence is examined for distortions that may have been generated due to packet losses. It must be noted that this algorithm should be able to classify between distortions caused by packet losses and distortions that were produced as a result of the lossy compression of the original video sequence. The algorithm for the detection and classification of distortions is out of the scope of the present invention. For example, the method in G. Valenzise et. al., "Estimating channel-induced distortion in H.264/AVC video without bitstream information," QoMEX, 2010, could be used for this purpose.

In the third step, the matching of the processed video sequence with the corresponding frame of the bit stream is performed. If the current picture of the processed video sequence was detected to contain distortions that were caused as a result of a packet loss, then that picture is matched with the part of the bit stream corresponding to the frame which was found (in the initial step) to contain the packet loss.

Finally, the synchronisation information (that is, the current frame of the PVS along with its corresponding part of the video bit stream) is computed. This information can be forwarded as input to the module which is responsible for the assessment of video quality.

The prior art mentioned in the above introductory part considers the problem of temporal synchronisation between two video sequences due to frame skipping, repetition, deletion, shuffling, and data compression that may result due to the transmission of the video sequence over an erroneous network or the processing of the sequence. On the contrary, the present invention considers only the synchronisation of the processed video sequence with the bit stream at the end-user side and, thus, the only source of loss of synchronisation is the delay introduced by the decoder device and the bit stream analyzer and the different error concealment techniques applied by the decoder (STB) and the decoder within the probe device.

In the following, a method for the extraction of the type of frames of encrypted video based on their size is described, as mentioned above.

In a first step, the number of bytes for each video frame is estimated or calculated. Different methods may be appropriate to perform this task. For instance, the changes in certain timestamps in the transport layer can be exploited to detect the beginning of new frames, or certain bits in the header structures that are used to signal new frames may be utilized. In general these bit stream properties are available even in encrypted bit streams. Therefore, the frame sizes can either be calculated byte exact, or estimated well enough to perform the following steps.

In a second step, the video bit stream is scanned until the next I-frame is found, which represents the start of the next GoP.

In non-encrypted streams, the next I-frame (as all of the frame types) can be found by looking into the video-frame header. In encrypted streams, or if frame boundaries appear somewhere at unknown points within the payload, certain flags can be accessed instead, that mark I-frames as "random access points". If for some reason theses flags do not appear, still an analysis of encountered frame sizes can be used to detect I-frames, since their size is in general much bigger than those of P and B-frames.

In a third step, the sizes in byte of all subsequent video frames until the next I-frame will be captured in certain arrays until the next I-frame is encountered and therefore the GoP is completed.

In a fourth step these arrays will be matched to a number of predefined patterns that represent typical GoP structures. The best match is associated to a specific GoP structure which will in later steps serve as prototype for following GoPs and can therefore enable an easy a priori estimation of frame types of incoming frames.

For subsequent GoPs, the array of frame sizes may be reset, so that only data of the current GoP is used, or the frame sizes of a certain number of previous GoPs may be added up to obtain averaged values. In the latter case an additional array may be needed to note the number of frame size values added up in the elements of the array. Preferably, moving averages may be calculated, by applying:

for (all frames n within the current GoP)

$$FrameSizeArray[n]=(M-1)/M*FrameSizeArray[n]+1/M*FrameSize[n]$$

where M is the number of GoPs to be averaged.

Different weighting schemes may be used according to the invention.

Possible GoP Patterns

As stated above, a GoP usually has a specific structure that is composed of a certain sequence of P- and B-frames between the two I-frames which mark the boundaries of the GoP. Examples for typical GoP-structures are:

| | |
|---|---|
| I, b, b, P, b, b, P, b, b, P . . . | (the "classical" GoP-structure known from MPEG2) |
| I, b, B, b, P, b, B, b, P, b, B, b, P | (possible GoP-structure for hierarchical encoding, with B = reference B-frame b = non reference B-frame) |

It has to be taken into account that interlaced video is often encoded as "field sequence" comprising two independent fields for one video frame. In that case the above structures would look like:

I/P, b/b, b/b, P/P, b/b, b/b, P/P. . .
I/P, b/b, B/B, b/b, P/P, b/b, B/B, b/b, P/P. . .

forming distinct patterns that, if correctly detected, allow the decision between frame and field encoding even in encrypted streams. It is noted here that in field sequences often times only the first field of a key frame is actually coded as intra field. The second field of the key-frame may be a predicted field. In the above notation this would result in a I/P frame. Even P/I frames are possible.

The patterns above are visualized in "display order". In fact, the frames are transmitted in a different order, the so called "bit stream order" or "decoding order". Since B-frames have references in the past and the future, these future references have to be transmitted in advance resulting in a bit stream order as shown below:

| | |
|---|---|
| $I_0, P_1, b_2, b_3, P_4, b_5, b_6, P_7, b_8, b_9 \ldots$ | bit stream order |
| $I_0, b_2, b_3, P_1, b_5, b_6, P_4, b_8, b_9, P_7 \ldots$ | display order (with bit stream order index) |
| $I_0, P_1, B_2, b_3, b_4, P_5, B_6, b_7, b_8, \ldots$ | bit stream order |
| $I_0, b_3, B_2, b_4, P_1, b_7, B_6, b_8, P_5, \ldots$ | display order (with bit stream order index) |

Even for the same GoP-structure different patterns are possible. This is because there are the techniques of "closed GoP transmission" and "open GoP transmission".

In closed GoPs, the transmission of the content of different GoPs never overlaps. In open GoP-structures the first I-frame is transmitted before the B-frames preceding it in display order (the ones that are closing the preceding GoP). The examples above were shown in closed GoP fashion. The same example in open GoP fashion would look like:

| | |
|---|---|
| $b_{-2}, b_{-1}, I_0, b_2, b_3, P_1, b_5, b_6, P_4, \ldots$ | display order (open GoP) |
| $I_0, b_{-2}, b_{-1}, P_1, b_2, b_3, P_4, b_5, b_6, \ldots$ | bit stream order |
| $b_{-3}, B_{-2}, b_{-1}, I_0, b_3, B_2, b_4, P_1, b_7, B_6, b_8, P_5 \ldots$ | display order (open GoP) |
| $I_0, B_{-2}, b_{-3}, b_{-1}, P_1, B_2, b_3, b_4, P_5, B_6, b_2, b_8 \ldots$ | bit stream order | with the first two (three) B-frames (here marked in bold letters) belonging to the preceding GoP, which are transmitted after the I frame of the current GoP.

As can easily be seen, the bit stream order and therefore the resulting GoP-pattern differ in a distinct manner that, if correctly detected, allows the decision between closed GoP and open GoP sequences.

Other possible patterns include:

| | |
|---|---|
| I, P, P, P, P . . . | (GoP-structure without B-frames like used in video conferencing and other low delay applications) |
| I, b, P, b, P, . . . | (GoP-pattern with only one B-frame) |

It is within the scope of the invention to estimate the GoP-structure of any analysed video stream, may it be fully readable, encrypted or corrupted by packet loss. The only information needed to achieve this goal is the sizes in byte of every encountered video frame and the knowledge which of the frames are of type I-frame.

Calculation/Estimation of Frame Sizes

As this invention is based on the analysis of the byte sizes of all the frames in a video sequence, these sizes have to be extracted from the bit stream for every frame. There are many different transport schemes, which may require different actions to perform this task. The by far most important transport scheme on IP based networks is the "real time protocol" (RTP) however. Frame size extraction is therefore here described for RTP only but will work similarly for other transport schemes. The skilled person will be able to easily adopt the invention to any different transport scheme of his usage.

There are two major approaches to transmit video content over RTP:

The video is carried directly as a payload of the RTP packets. In this case audio and other possible information ("system" information) is carried in different RTP-streams having different port numbers. Therefore the video portion of the bit stream can easily be separated from the rest of the packets.

One video frame will in general consist of the payload of a number of RTP packets, each of which is carrying a timestamp. In the case of video, these RTP-timestamps are set to the relative decoding time of the video frame they carry. Since RTP packets can each have different sizes, a video frame will in general be in a number of complete RTP-packets. To calculate the size of a video frame in this case, only the payload sizes of all RTP-packets with the same timestamp have to be added up.

Even if frame boundaries appear within a single RTP-payload, frame sizes can be estimated quite well by the above value. No access to the payload itself, which might be encrypted, is necessary.

The RTP-sequence number, which is part of the RTP-header, can be accessed in order to detect RTP-packet losses. Since the size of a lost packet cannot be known, it needs to be estimated. This can be done by some kind of average size of past packets.

Video is carried over RTP, but the payload is a "transport stream" (TS). In a TS, video, audio and other information is multiplexed into a single stream. Each of the multiplex packets have a size of 188 byte including the small TS-header. One RTP-packet carries 7 of these TS-packets, which are marked by the so called "program ID" (PID) as belonging to a specific sub stream. One of theses sub streams is the video to be analysed. Even in encrypted streams, the TS-headers are in general not encrypted, and can therefore be accessed. They allow for an exact measurement of frame sizes. In case of RTP-packet losses, a so called "continuity counter" within the TS-header can be utilized to calculate the number of lost sub stream-packets separately for each sub-stream for the particular RTP-loss. Since TS-packets are much smaller than RTP-packets, and (in absence of the rare case of stuffing) have the same payload size, the number of lost bytes can be estimated more accurate. The mentioned continuity counter in the TS-header has only 4 bits. Therefore up to 16 missing TS-packets can be detected. Together with the known number of missing RTP packets and a value for the average number of TS-sub stream packets per RTP packet which can easily be calculated, an accurate estimation for lost TS-packets larger than 16 can be estimated.

Since the RTP timestamp is synchronized to the relative decoding time of the video frame they carry, even complete missing frames can be detected, because in such a case the RTP-timestamp would be incremented by more than one time difference between successive frames.

Detection of I-Frames

In order to start analysis, the bit stream is scanned to find the beginning of the next I-frame, which marks the beginning of a new GoP. I-frames can be detected by different means. In case of a non encrypted stream, the frame headers of the elementary stream may easily be accessed for all video-frames. Video frame headers explicitly contain the frame type.

If the video is carried directly as RTP-payload, frame-headers should always appear with the first byte in the payload of every RTP-packet coming after an RTP-packet with the M-bit of the RTP-header set to 1. If frame headers may appear as well within the payload of an RTP-packet, they can easily be searched for, because they contain a unique byte sequence.

In the case that TS over RTP is used, the so called "random_access_flag" within the adaptation-field of the TS-header can be exploited. It signals that the coming frame was coded as I-frame. Even in encrypted streams the adaptation field as part of the TS-header is usually not encrypted.

Once frame boundaries are known, I-frames can also be detected empirically. Their average size is usually much bigger than those of P and B-frames.

Once the beginning of an I-frame is found, the beginning of the next GoP is found as well. From that point on the sizes of all subsequent frames are gathered in a number of possible ways. In the following description this gathering process is continued for a complete GoP until the analysis of the gathered data is started. In other embodiments of the invention the collecting period can have a different length.

First Embodiment of Data Collecting and Pattern Matching

One Long Array of Frame Sizes

After the initial I-frame of the current GoP has been encountered, the frame sizes of all subsequent frames are stored into the elements of an array, with the index of the array equal to the number of frames past said I-frame. This is preferably done until the next I-frame is detected, signalling the end of the first GoP to be analysed. The so constructed array of frame sizes is the input to a pattern matching process that compares this array to a set of typical patterns, and outputs an estimated GoP-pattern and other data where applicable.

If the analysed bit stream is not encrypted, and therefore the frame types are known to the algorithm, the real frame sizes can be replaced by standardized values like '1' for non-reference B-frames, '2' for reference B-frames and '4' for P-frames, which serve the same purpose as the real frame sizes, but do not introduce any statistical uncertainty.

Pattern Matching

In an embodiment of the invention, the array of frame sizes would be matched to binary patterns with '0' for B-frames and '1' for P-frames. The example GoP-structures above would therefore be matched to patterns like:

| | |
|---|---|
| 0, 0, 1, 0, 0, 1 . . . | (I, b, b, P, b, b, P structure with open GoP) |
| 1, 0, 0, 1, 0, 0 . . . | (I, b, b, P, b, b, P structure with closed GoP) |
| 0, 0, 0, 1, 0, 0, 0, 1 . . . | (I, b, B, b, P, b, B, b, P structure with open GoP) |
| 1, 0, 0, 0, 1, 0, 0, 0 . . . | (I, b, B, b, P, b, B, b, P structure with closed GoP) |

In this embodiment of the invention, the "array of frame sizes" would therefore be converted into a binary array as well. In the easiest case, a single reference value would be used to replace the values of every element of said array into '0' for "small sized frame(s)" and '1' for "large frame(s)". The reference value to decide between "large" and "small" could simply be the average of all elements multiplied by a factor>1. In alternative embodiments the threshold could be the median value of all array elements or a weighted combination of the smallest and largest of the elements or other combinations of the array elements. Also, the threshold could be adopted for a small number of frame size values. This could be accomplished by varying one of the described threshold values by a factor or an additive term or by calculating the threshold only from frame size values in a certain neighbourhood of the current value.

In general it may be reasonable not to use the first few values in the array, because immediately after an I-frame P- and B-frames often times have irregularly small sizes.

Matching Process

The length of a GoP is in general not known in advance. Typical values are one I-frame per every 1 or 2 seconds, resulting in a GoP length of for instance 25 to 50 frames (or 50 to 100 fields for "field coding" modes) for the typical frame rate of 25 frames/sec. Usually the encoder has a scene-cut detection and places an I-frame on every scene-cut position. Therefore, if scene-cuts are encountered, GoP's can have any size down to 2 or even 1 frame.

In contrast to overall length, the basic patterns of each of the possible GoP structures are constant and short (for instance 0,0,1 for the I, b,b,P, . . . example). For the purpose of matching with the elements of a complete GoP, these simple basic patterns have to be repeated until the actual GoP-size is reached.

In embodiments of the invention where only binary matching is applied, the matching process itself may be a simple "exclusive nor" operation on every element of the converted array of frame sizes with the concatenated basic pattern elements. The results of these "exclusive nor" operations are then added up to a matching score for the used pattern. This is done with all available predefined patterns.

The specific pattern, which gains the highest score number, is considered the best match and its associated GoP-structure, frame/field-status, open/closed-status are than adopted for further analysis.

Differentiating Between Hierarchical Coding and Conventional B-Frame Coding

In the case that more than two consecutive B-frames are estimated in the best matching GoP-pattern, it is likely that the sequence of frames had been coded with the "Hierarchical Coding" method with reference B-frames as mentioned above. If this is the case it is likely that these reference B-frames have a larger frame size in bytes than the non reference B-frames (above labelled as b-frames).

To gain a reliable estimation whether hierarchical coding or non hierarchical coding is used, every subset of consecutive B-frames (between two P-frames) may be examined whether the frame sizes for those elements in the subset standing for reference B-frames are significantly larger than all the other elements representing B-frames in said subset. In case of 3 consecutive B-frames this is the first subset element, in case of 5 consecutive B-frames these are the first and the second subset elements. In case of 7 consecutive B-frames these are the first, second and third subset elements (in decoding order). Other combinations are very unlikely for hierarchical coding. If this condition is true for the magnitude of sets of consecutive B-frames a GoP, hierarchical coding can be assumed.

For patterns with more than 3 B-frames hierarchical coding may be assumed even without the described test, since more than three B-frames in a row without hierarchical coding is extremely unlikely.

Applying the resulting estimated GoP-structure to the frames of following GoP's results in a reliable estimation of frame types of these frames, when the sequence is encrypted, or frame headers are missing due to packet loss.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps. A single unit may fulfil the functions of several features recited in the claims.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for temporally synchronizing an input video bit stream with a processed video sequence corresponding to the input video bit stream decoded by an external video decoder, the method comprising the steps of:
   supplying the input video bit stream to a bit stream analyzer of a probe device;
      parsing and analyzing, by the bit stream analyzer of the probe, the input video bit stream;
      decoding, by a decoder of the probe, at least a portion of the input video bit stream to generate reconstructed images;
      storing the reconstructed images in a buffer; and
      comparing, by the probe, frames of the processed video sequence with each of the stored reconstructed images to find a matching frame n*; and
      providing, by the probe, a hybrid video quality assessment based on the matching frame n*.

2. The method of claim 1, wherein the comparing step is performed in the pixel domain.

3. The method of claim 1, wherein the parsing and analyzing step further comprises extracting, from the bit stream, for each image:
   packets that have been lost due to transmission errors and corresponding areas within each frame that have been affected by the packet loss; and
   an error propagation map based on motion vectors and macro block types, which denotes which pixels of each frame reference an erroneous region for their prediction and are prone to have been impacted by the packet loss.

4. The method of claim 1, wherein the comparing step comprises:
   computing a distance metric between the processed video sequence and the reconstructed image in the buffer by exploiting information extracted from the bit stream and the processed video sequence.

5. The method of claim 4, wherein the information extracted from the bit stream comprises spatial and temporal location of impairments due to packet loss.

6. The method of claim 1, wherein providing the hybrid video quality assessment includes estimating a subjective quality score based on the obtained information from the bit stream and the processed video sequence.

7. A method for temporally synchronizing an input video bit stream with a processed video sequence corresponding to the input video bit stream decoded by an external video decoder, the method comprising the steps of:
   supplying the input video bit stream to a bit stream analyzer of a probe;
      analyzing, by the bit stream analyzer, the input video bit stream to generate error maps I(x,y,t) and a set A of pixels that have been impacted by packet loss, wherein I(x,y,t) denote the error map value at location (x,y) of the t-th frame, x=0, 1, . . . , M, and y=0, 1, . . . , N, where M, N are the horizontal and vertical dimensions of each frame of the video sequence, respectively;
      generating error maps and a set of pixels impacted by packet loss corresponding to the processed video sequence;
      comparing an error map corresponding to a frame of the processed video sequence with each of the error maps corresponding to the input video bit stream to find a matching frame n*; and
   providing, by the probe, a hybrid video quality assessment based on the matching frame n*.

8. The method of claim 7, further comprising, before the comparing step:
   estimating impaired macroblocks of the frame of the processed video sequence;
   computing a contour of the pixels that belong to an area affected by the packet loss; and
   comparing a contour of the processed video sequence with a contour of the error maps corresponding to the input video bit stream.

9. A method for temporally synchronizing an encrypted input video bit stream with a processed video sequence corresponding to the encrypted input video bit stream decoded by an external video decoder, the method comprising the steps of:
   a) supplying the encrypted input video bit stream to an analysis module of a probe;
   b) analyzing, by the analysis module, packet header information of the encrypted input bit stream, and determining a size and a type of frames corresponding to the encrypted input video bit stream;
   c) extracting, based on the sizes and types of the frames corresponding to the encrypted input video bit stream, features representative of content corresponding to the frames corresponding to the encrypted input video bit stream;
   d) extracting features representative of content corresponding to a frame of the processed video sequence; and
   e) comparing the features extracted in step d) with the features extracted in step c) to synchronize the encrypted input video bit stream with the processed video sequence.

10. The method of claim 9, wherein the features extracted in steps c) and d) are time-varying features.

11. The method of claim 9, wherein steps c) and d) are performed in a pixel domain.

12. The method of claim 9, further comprising:
   evaluating, by a video quality assessment module of the probe, the quality of the processed video sequence based on the synchronization.

13. The method of claim 9, wherein step b) further comprises detecting frames that have been affected by packet loss, and the method further comprises the steps of:
   f) examining the frame of the processed video sequence for artefacts generated due to packet losses; and
   g) matching the frame of the processed video sequence with a corresponding frame of the encrypted input video bit stream, wherein, if the frame of the processed video sequence was detected in step f) to contain artefacts resulting from packet loss, then the frame is matched with a part of the encrypted input video bit stream corresponding to a frame which was found in step b) to have been affected by packet loss.

14. An apparatus for temporally synchronizing an input video bit stream of a video decoder with a processed video sequence corresponding to the input video bit stream decoded by an external video decoder, the apparatus comprising:
   a bit stream analyzer for receiving the input video bit stream, the bit stream analyzer being configured for parsing and analyzing the input video bit stream; and
   a synchronization module being configured for synchronizing the analyzed input video bit stream with the processed video sequence, the synchronization module comprising:

a decoder configured to decode at least a portion of the input video bit stream to generate reconstructed images;

a buffer being configured to store the reconstructed images; and a pixel-domain comparison unit being configured to: compare frames of the processed video sequence with each of the reconstructed images in the buffer; and determine a matching frame.

15. The apparatus of claim 14, further comprising:

a video quality assessment module configured to evaluate the quality of the video sequence based on the determined matching frame and synchronized information from the input video bit stream and processed video sequence.

16. The apparatus of claim 14, wherein the comparison unit is further configured to compute a distance metric between the processed video sequence and the reconstructed images in the buffer by exploiting information extracted from the bit stream.

17. The apparatus of claim 14, wherein the comparison unit is further configured to output the matching frame to the video quality assessment module.

18. The apparatus of claim 14, wherein the bit stream analyzer is further configured to extract, from the input video bit stream:

packets that have been lost due to transmission errors and corresponding areas within each frame that have been affected by packet loss; and an error map based on motion vectors and macro block types, which denotes which pixels of each frame reference an erroneous region for their prediction and are prone to have been impacted by the packet loss.

19. An apparatus for temporally synchronizing an input video bit stream with a processed video sequence corresponding to the input video bit stream decoded by an external video decoder, the apparatus comprising:

a bit stream analyzer for receiving and analyzing the input video bit stream;

a synchronization module being configured for:

generating error maps $I(x,y,t)$ and a set A of pixels that have been impacted by packet loss corresponding to the input video bit stream, wherein $I(x,y,t)$ denote the error map value at location $(x,y)$ of the t-th frame, $x=0, 1, \ldots, M$, and $y=0, 1, \ldots, N$, where M, N are the horizontal and vertical dimensions of each frame of the video sequence, respectively;

generating error maps and a set of pixels impacted by packet loss corresponding to the processed video sequence; and comparing an error map corresponding to a frame of the processed video sequence with each of the error maps corresponding to the input video bit stream to find a matching frame $n^*$, the matching frame $n^*$ being usable to synchronize the input video bit stream with the processed video sequence based on frame shift information; and a video quality assessment module configured to evaluate the quality of the video sequence based on the matching frame $n^*$.

20. An apparatus for temporally synchronizing an encrypted input video bit stream with a processed video sequence corresponding to the encrypted input video bit stream decoded by an external video decoder, the apparatus comprising:

a bit stream analyzer for receiving the encrypted input video bit stream, the bit stream analyzer being configured for analyzing packet header information of the encrypted input bit stream, and determining a size and a type of frames corresponding to the encrypted input video bit stream; and a synchronization module being configured for:

extracting, based on the sizes and types of the frames corresponding to the encrypted input video bit stream, features representative of content corresponding to the frames corresponding to the encrypted input video bit stream;

extracting features representative of content corresponding to a frame of the processed video sequence; and comparing the features of the frame of the processed video sequence with the features of the frames corresponding to the encrypted input video bit stream.

* * * * *